United States Patent [19]

Schwarzschild et al.

[11] 4,219,809
[45] Aug. 26, 1980

[54] COMPENSATION SCHEME FOR ELECTROCHROMIC DISPLAYS

[75] Inventors: Jack Schwarzschild; Alan E. Willis, both of Stamford; Scott P. Wilson, Wolcott, all of Conn.

[73] Assignee: Times Corporation, Waterbury, Conn.

[21] Appl. No.: 925,580

[22] Filed: Jul. 17, 1978

[51] Int. Cl.² .......................................... G06K 15/18
[52] U.S. Cl. ...................... 340/785; 368/241; 340/763; 340/812; 350/357
[58] Field of Search .............. 340/785, 805, 812, 813, 340/803, 763; 350/357; 58/50 R

[56] References Cited
U.S. PATENT DOCUMENTS

| | | | |
|---|---|---|---|
| 3,797,225 | 3/1974 | Hama | 58/50 R |
| 3,807,832 | 4/1974 | Castellion | 350/160 R |
| 3,839,857 | 10/1974 | Berets | 340/763 |
| 3,881,311 | 5/1975 | Hama | 58/50 R |
| 3,908,355 | 9/1975 | Wiesner | 340/785 |
| 3,932,860 | 1/1976 | Cohen | 340/785 |
| 3,949,242 | 4/1976 | Hirasawa | 307/205 |
| 3,950,936 | 4/1976 | Oguey | 340/785 |
| 3,987,433 | 10/1976 | Kennedy | 340/763 |

FOREIGN PATENT DOCUMENTS 2650732   5/1977   Fed. Rep. of Germany ........... 350/357

*Primary Examiner*—David L. Trafton

[57] ABSTRACT

A driving circuit for an electrochromic display cell wherein writing and erasing of a segment is effected by relatively high write and erase transition potentials. After a predetermined transition period, the written and erased segments are stabilized at a desired coloration or transparency by application of a maintaining write potential(s) and a maintaining erase potential(s) respectively. The write maintain potential is periodically adjusted to a level whereby a predetermined charge level is maintained on the written segments. In this manner, a maintain potential on the segments(s) is periodically adjusted to compensate for degradation of the electrochromic material and to thereby maintain the desired contrast ratio between the written and erased segments.

4 Claims, 4 Drawing Figures

COMPENSATION SCHEME FOR ELECTROCHROMIC DISPLAYS

FIELD OF THE INVENTION

This invention relates to a driving arrangement for passive electrooptic display devices and, in particular, to a driving arrangement for an electrochromic display. The driving arrangement can be utilized with electrooptic displays to display figures, letters, symbols and the like in a timepiece, calculator, meter or the like.

BACKGROUND OF THE INVENTION

In recent years a great deal of interest has been shown in the provision of electrochromic displays having, for example, a digital or analog readout such as in commonly assigned U.S. Pat. No. 3,908,355 issued Sept. 30, 1975 in the name of Leo Wiesner and U.S. Pat. No. 3,987,433 issued Oct. 19, 1976 in the name of Richard Howard Kennedy.

Other prior art patents of interest include U.S. Pat. No. 3,932,860 issued Jan. 13, 1976 to Sam G. Cohen, U.S. Pat. No. 3,881,311 issued May 6, 1975 to Tetsuro Hama et al, U.S. Pat. No. 3,797,225 issued Mar. 19, 1974 to Tetsuro Hama et al, U.S. Pat. No. 3,949,242 issued Apr. 6, 1976 to Masataka Hirasawa et al, U.S. Pat. No. 3,807,832 issued Apr. 30, 1974 to George Augustus Castellion and U.S. Pat. No. 3,839,857 issued Oct. 8, 1974 to Donald Joseph Berets et al. These prior art patents are merely typical of the art showing passive electrooptic display devices and other pertinent references may exist.

From the prior art, it is known to write a selected segment(s) by applying a (single) write voltage potential (usually having a negative polarity) with respect to a common electrode for a period to completely write the selected segment(s) and then either removing the write potential from the written segment(s) or continuously applying the write potential to the written segment(s).

SOME OF THE PROBLEMS RECOGNIZED AND SOLVED BY THE PRESENT INVENTION

Applicant has determined that the charge retention ability or inherent memory of the electrochromic layer is insufficient or unable to maintain a desired charge level and, therefore, a substantially consistent contrast ratio, over varying and/or extended time periods.

Continuous application of the write potential to the written segment(s) results in over coloration and possible degradation of the electrochromic layer and inability to satisfactorily erase such a damaged segment.

In total contrast to the prior art, the present invention provides for the periodic injection of charge at a potential(s) to maintain predetermined segment charge levels and, therefore, substantially consistent desired contrast ratio to compensate for aging/degradation of the electrochromic cell which otherwise might result in undesired contrast ratio.

SUMMARY OF THE INVENTION

Generally speaking, in accordance with the invention, a driving arrangement is provided having means for applying a transition potential across the segment(s) to be written for approximately a predetermined transition period after which a maintain potential(s) is applied to the written segment(s) to substantially maintain a desired written state thereon.

It is, therefore, an object of the present invention to provide an electrochromic display means which maintains a desired level of segment coloration over an extended period of time.

It is a further object of the invention to provide means for maintaining a desired contrast ratio between written and erased segments of an electrooptical display over varying periods of time.

It is a further object of the invention to provide an improved electrochromic display means for substantially maintaining a desired contrast ratio.

Another object of the invention is to provide means for sensing the charge of a written electrochromic layer(s) and for incrementally and periodically adjusting the potential on said layer for maintaining a substantially consistent predetermined contrast ratio.

It is still a further object of the invention to provide an improved method of applying potential to an electrochromic display, for sensing the charge retention of a segment and for applying a maintain write potential to the electrode-segment(s) to maintain a desired contrast ratio.

These and other objects and features of the present invention will be apparent from the description of the preferred embodiment of the invention, taken in conjunction with the accompanying drawings, in which.

DETAILED DESCRIPTION OF THE INVENTION

Figure 1:
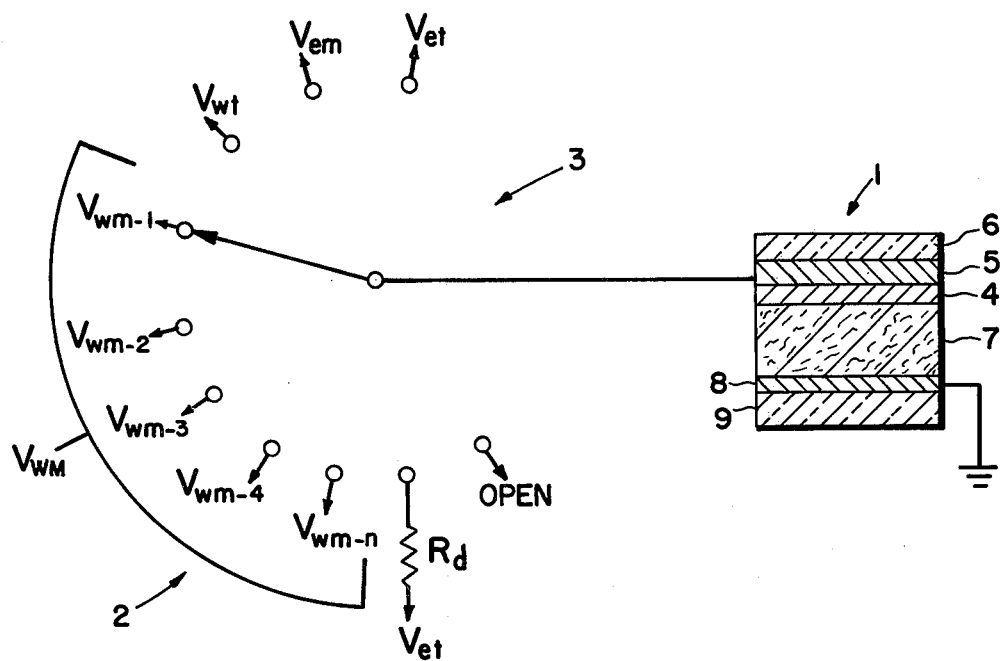
FIG. 1 is a circuit diagram illustrating the driving arrangement for a passive display element in accordance with the invention.

Referring now to FIG. 1 of the drawings, the preferred embodiment of the present invention comprises an electrochromic display structure 1 being actuated from a multiple voltage supply 2 by means of a switch device or segment drive control means 3. The essential elements of the electrochromic display (ECD) comprises an electrochromic (EC) layer or segment 4 deposited on an electrode 5 formed on a glass substrate 6 such as commercially available NESA glass, an electrolyte-separator layer 7 contacting the EC layer 4 and a counterelectrode 8. The counterelectrode is formed, for example, by oxidizing and partial reducing of tungsten on a glass or ceramic substrate 9. To enchance contrast between the colored and uncolored states, a pigment may be added to the electrolyte-separator layer 7. White $T_iO_2$ is suitable.

The display is preferably an electrochromic device using a well known phenomenon such as is described in U.S. Pat. Nos. 3,704,057 issued Nov. 28, 1972 to Lindley Claire Beegle, 3,708,220 issued Jan. 2, 1973 to M. Meyers and T. Augurt and 3,807,832 issued Apr. 30, 1974 to George Castellion.

Briefly stated these electrooptical devices exhibit the phenomenon whereby the light absorbing ability of the activated area is varied by the application of an electric voltage to the electrochromic material turning it darker, for example, decreasing its light transmitting ability over the area of the electrode or segment activated. Generally, application of a voltage of one polarity, for example, negative with respect to the counterelectrode, to the electrochromic layer causes it to increase its light absorption, i.e., to turn darker or write. Application of a voltage of opposite polarity causes bleaching or erasing. The activated segment somewhat retains in a memory-like manner this varied light absorbing characteristic, written or erased, for a period of time until the application of a voltage of opposite polarity.

Typically, in the prior art, after writing or erasing, the written or erased segment was disconnected from the writing or erasing potentials and allowed to float. However, change of charge on the segment may result causing fading of the written segment and/or coloration of the erased segment. The rate of fading, i.e., loss of charge, may vary over a given period of time due to aging effects.

This undesirable characteristic of the prior art electrochromic display devices can result in reduced or inconsistent contrast ratio between the written and erased segments/figures causing a less distinctive or dissimilar appearing segments/figures.

In accordance with the present invention, a driving arrangement is provided for an electrochromic display cell 1 wherein writing or erasing of a segment(s) 4 is effected by the application of a (relatively high) transition write voltage $V_{wt}$ or transition erase voltage $V_{et}$ respectively. Transition voltages/potentials are selected so as to effect transition, i.e., coloration or bleaching, as rapidly as possible without causing undesirable electrochemical reactions leading to degradation of the display. After the transition period, which is predetermined to effect substantially adequate coloration or bleaching of the segment 4, the written or erased segment 4 is stabilized or maintained at the desired state of coloration or transparency by the application of a maintain write voltage $V_{WM}$ or a maintain erase voltage $V_{em}$. The maintaining voltages $V_{WM}$, $V_{em}$ are at a lower voltage potential level, with respect to the counterelectrode, than the respective transition voltages $V_{wt}$, $V_{et}$. In this manner, an equilibrium is substantially achieved whereby the loss of charge on a segment is replenished to, thereby, substantially maintain the desired level of segment coloration and/or transparency.

In operation, if segment 4 is to be written a transition write voltage $V_{wt}$ is applied to the electrode 5, via switch 3, making the EC layer 4 negative with respect to the common electrode 8 for a predetermined (write) transition period. The transition period is selected, either empirically or by calculation, to cause segment 4 to turn substantially to the desired darkness. After the predetermined transition write period, the segment 4, via switch 3, is disconnected from the transition write voltage $V_{wt}$ and is then coupled to a maintain write voltage $V_{WM}$ to maintain the desired perceived darkness or coloration of the segment.

If segment 4 is to be erased, electrode 5 is disconnected from the maintain write voltage $V_{WM}$ and coupled, via switch 3, to the transition erase voltage $V_{et}$ making the EC layer 4 positive with respect to the common electrode 8 for a predetermined transition (erase) period. After the predetermined transition (erase) period, the electrode 5, via switch 3, is disconnected from the transition erase voltage $V_{et}$ and is then coupled to the maintain erase voltage $V_{em}$ to maintain the desired perceived transparency or unwritten state.

Switch 3, although illustrated as a manually actuatable switch may comprise electronic switching means well known in the art.

The EC layer which generally is formed from a tungsten oxide material tends to dissolve in aqueous electrolytes. The dissolving results in reduction of contrast ratio as the electrochromic film gets thinner due to aging.

This relationship can be illustrated theoretically by the following:

$$C.R._{final} = (C.R._{initial})^{\frac{final\ thickness}{initial\ thickness}}$$

for a fixed write maintain voltage. The contrast ratio obtained is a function of charge $$C.R. = E^{kq}$$

where k is a constant and q represents the charge.

Figure 3:
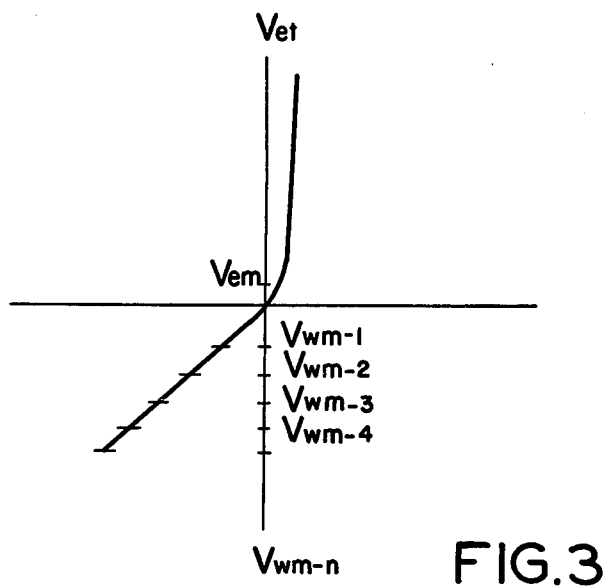
FIG. 3 is a waveform diagram illustrating various charge/discharge-potentials on an electrode-segment between $V_{WM}$ and $V_{et}$.

In accordance with the compensation scheme of this invention, a plurality of maintain write voltages are provided to ensure adequate charging of the segments to effect desired contrast ratio. In operation, as noted above, if segment 4 is to be written, a predetermined transition write voltage ($V_{wt}$) is applied to the electrode 5, via switch 3, for a predetermined period, causing the EC segment layer 4 to become opaque (written). After the transition write period, the segment 4, via switch 3, is disconnected from the transition write voltage $V_{wt}$ and is then coupled to a maintain write voltage and held, for example, at $V_{wm}-1$ for a period of time to stabilize the EC layer 4 at a charge corresponding to the desired perceived darkness or coloration. Segment 4 is then coupled, via switch 3 and resistor, $R_d$, to the transition erase voltage $V_{et}$. The voltage developed across resistor $R_d$ will initially be $V_{Rd}$(instantaneous)=$V_{WM}-V_{et}$. This voltage will decrease slowly until the cell approaches the erase condition at which point the display will exhibit a high impedance and the voltage across the resistor $R_d$ will decrease rapidly. Until this rapid decrease, the current through resistor $R_d$ will approximate a constant current source. Therefore, the segment charge level and its discharge time through resistor $R_d$ prior to the high impedance point of the cell are the analog of each other. The discharge voltage being developed across $R_d$ is sensed/monitored and the segment charge is thereby determined. At the end of a predetermined time, the voltage across resistor $R_d$ is sensed, and if, at that time, the voltage is greater than a predetermined value, for example, 1/3 ($V_{WM}\frac{1}{2}-V_{et}$), which is in the rapid decrease area of the voltage curve as illustrated in FIG. 3, normal operation is resumed. A first predetermined maintain voltage $V_{wm}-1$, as illustrated by the solid line connection of switch 3, is applied to the electrode for charging segment 4 to a first predetermined charge for effecting a desired contrast ratio. Electrode 5 is then coupled, as illustrated by the dashed line connection of switch 3, through a (large) resistor $R_d$ to the transition erase voltage $V_{et}$. The write maintain charge previously stored on segment 4 begins a slow discharge through the large resistor $R_d$. After a predetermined discharge period, the voltage across resistor $R_d$ is sensed. If this interrogation voltage is equal to or more positive than a predetermined reference voltage level, e.g., $V_{em}$, segment 4 is coupled to the next more negative voltage $V_{wm}-2$. The process is repeated until the interrogation voltage is negative with respect to the predetermined reference voltage level. In this manner, periodically a write maintain voltage is provided to segment 4 to maintain a desired contrast ratio over varying or prolonged time periods. In accordance with the preferred embodiment of this invention, the interrogation voltage is compared with or against the predetermined reference voltage, i.e., the erase maintain voltage $V_{em}$, which, as illustrated in FIG. 3, corresponds approximately to the knee or high impedance point of the cell.

Figure 2:
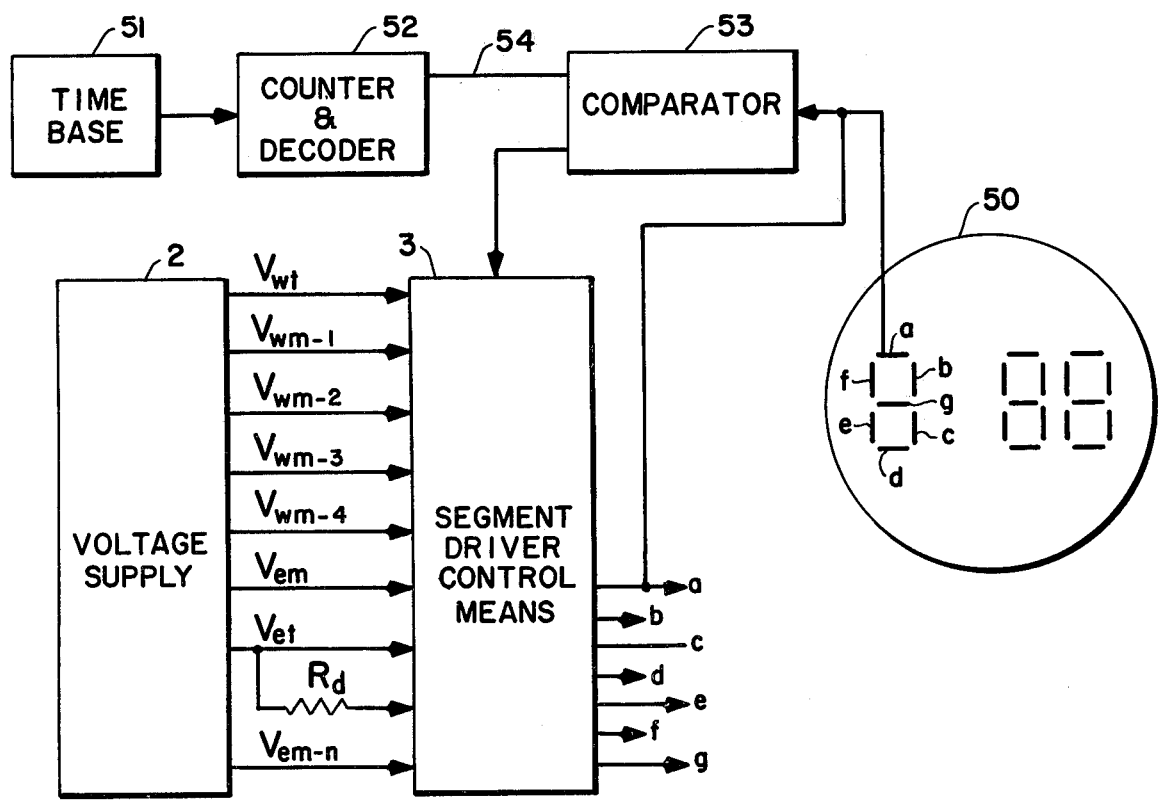
FIG. 2 is a circuit diagram of one embodiment of the driving arrangement in accordance with the invention.
Figure 4:
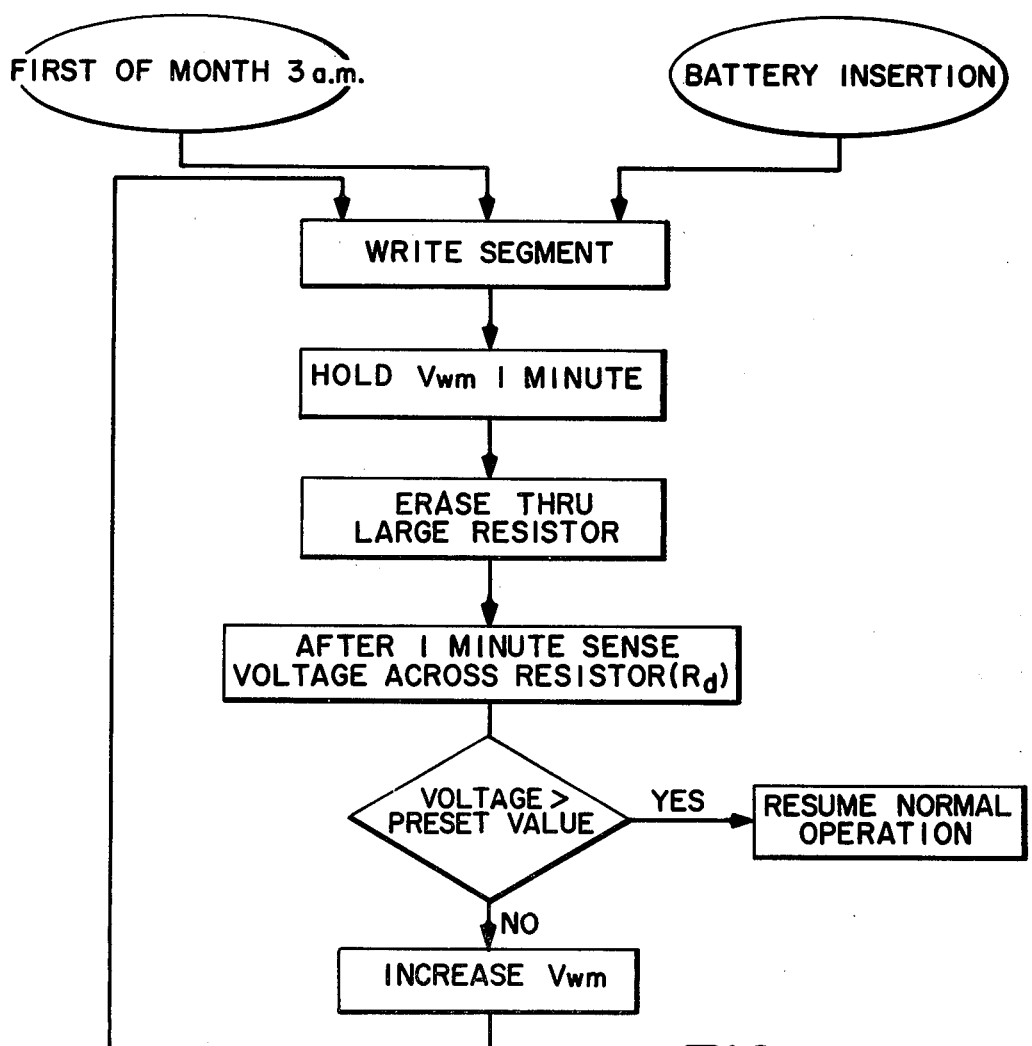
FIG. 4 is a block diagram illustrating the operational sequence for sensing and adjusting the level of write maintain voltage to obtain substantially consistent or constant contrast ratio.

Referring now to FIGS. 2 and 4, a block diagram of the electronic circuitry for a timeplace embodiment of this invention and the preferred logic flow illustrating the sequence for testing the ability of the segment to retain charge-potential are shown, respectively. The electrochromic display 50 is actuated by electronic circuitry which generally consists of a time base 51, counter and decoder section 52 and a display driver 3. In the embodiment illustrated in FIG. 2, a multiple voltage supply is shown to provide the separate voltage levels, $V_{wt}$, $V_{WM}$, $V_{et}$ and $V_{em}$, to each of a plurality of segment drive control means 3 for selective energization of the segments, for example, A through G of each display indicia. The segment drive control means 3 may take the form of a plurality of transistor switches which are responsive to control signals from the comparator 53. The comparator 53 is provided for sensing the interrogation voltage of each segment A through G of the display indicia and compares same with the predetermined voltage $V_{em}$. The comparator 53 is provided for sensing the state, i.e., written or erased, of each segment A through G of the display indicia and compares same with the counter and decoder 52 (segment) command signal 54 to avoid reapplication of a transition voltage to a segment which is required to be maintained in a desired (written or erased) state determined by the command signal. The comparator 53 compares the command signal 54 with the state of the segment to be written or erased and controls the segment drive control means 3 to apply the proper voltage potentials to the selected electrode to write, erase or maintain the selected segment in a desired state.

In addition, the comparator during predetermined sensing periods, for example, upon insertion of the battery into the timepiece and/or during a specified time or period during the week, month or year initiates the compensation scheme in accordance with this invention. Thus, the interrogation voltage is sensed at predetermined periodic intervals or selected events and as noted above, if the interrogation voltage is more negative than the predetermined voltage $V_{em}$, the preset initial write maintain voltage $V_{wm}-1$ is maintained and the watch is placed back into normal operation. However, if the interrogation voltage is equal to or more positive than the predetermined voltage, the comparator controls the segment drive control means 3 to increment to a higher write maintain voltage, e.g., $V_{wm}-2$. This sequence is repeated until the proper voltage maintain level is obtained and then the watch resumes normal operation. The comparator circuit may take the form of operational amplifiers and logic circuitry known to those skilled in the art.

The arrangement of FIG. 1 utilizes separate write and erase voltage supplies. These voltages, however, may be obtained from a single voltage supply, for instance by a voltage divider (not shown). The values of these voltages are so chosen with respect to the potential on the counterelectrode to effect the desired write or erase transition or maintain voltages. Suitable values are:

| Write Transition: | $V_{wt}$ | −0.35 Volt |
|---|---|---|
| Write Maintain: | $V_{wm}-1$ | 0 Volt |
| | $V_{wm}-2$ | −0.1 Volt |
| | $V_{wm}-3$ | −0.2 Volt |
| | $V_{wm}-4$ | −0.3 Volt |
| Erase Transition: | $V_{et}$ | +0.8 Volt |
| Erase Maintain: | $V_{em}$ | +0.4 Volt | where the ECD comprises a display, for example, as described in the above referenced U.S. patents.

The arrangement of FIG. 2 uses segment drive control means 3 to selectively actuate maintain the ECD, for example, wristwatch display. The voltage potentials, i.e., $V_{wt}$, $V_{WM}$, $V_{et}$, $V_{em}$, between the segment(s) 4 and counterelectrode 8 may be established by means of alternating voltage-potentials applied to both the segment(s) 4 and counterelectrode 8 to effect substantially simultaneous fade-in and fade-out of segments undergoing change and/or pulsed application of the maintain charge-potentials. These procedures, in accordance with the teachings of U.S. Pat. No. 3,987,433 issued Oct. 19, 1976 to Richard Howard Kennedy the teachings of which are herein incorporated by reference, minimizes ambiguity and provides improved displays as explained in detail in the referenced patents.

Briefly stated, the writing and erasing (transition) voltages, i.e. $V_{wt}$ and $V_{et}$, are applied alternately in rapid succession during time intervals which are short compared to those required for complete writing or erasing. In each of these several successive intervals, only partial writing or erasing is achieved. The transition voltage-potentials are applied across the selected segments for a time interval called the transition period. Each application of a write or erase voltage-potential effects only incomplete writing or erasing. However, the effect is cumulative, and writing and erasing are perceived to occur simultaneously, minimizing the display of meaningless symbols.

What is claimed is:

1. An electrochromic display comprising:
   a first transparent substrate with a selectively actuatable electrode thereon and an electrochromic layer on said transparent electrode;
   a second substrate having a conductive counterelectrode thereon;
   electrolyte means sealed between the first and second substrates and in electrical contact with said counterelectrode and said electrochromic layer;
   first means for selectively applying a transition write potential between said electrodes for a predetermined transition period;
   second means for selectively applying a first maintain write potential between said electrodes; and
   third means responsive to the charge storage ability of said electrochromic layer with application of said first maintain write potential for selectively applying a second maintain write potential between said electrodes.

2. An electrochromic display as in claim 1 wherein:
   the transition write potential is at a relatively high level with respect to the first and second maintain write potentials; and
   the second maintain write potential is at a predetermined higher level than said first maintain write potential.

3. An electronic timepiece comprising:

an electrochromic display having a plurality of segment indicia each comprising a selectively actuatable transparent electrode with an electrochromic layer thereon;

means for providing electrical signals representing information;

display control means responsive to said signals representing information for providing a write potential on a selected written segment indicia for a predetermined transition write period, said display control means being responsive to the write charge level on sid written segment indicia to selectively provide one of a plurality of maintain write charging potentials on said written indicia whereby a predetermined write charge is substantially maintained on said written segment indicia for compensating with dissolution of the electrochromic layer on said written indicia.

4. An electrooptical display comprising:

a first transparent substrate with a selectively actuatable transparent electrode thereon and a layer having electro-chemical controllable optical properties on said transparent electrode;

a second substrate;

a counterelectrode between said layer and said second substrate;

electrolyte means sealed between the first and second substrate and in contact with said counterelectrode and said layer;

first means for selectively applying a transition write potential between said electrodes; and second means responsive to a charge on a written layer for selectively applying a first and a second maintain write potential each at a different voltage-potential level with respect to said transition write potential to substantially maintain a predetermined state of coloration of the written layer.

* * * * *